Jan. 31, 1961    J. R. NEWCOMER, JR., ET AL    2,969,667
LATCH FASTENER

Filed May 14, 1956    3 Sheets-Sheet 1

INVENTORS.
JACOB R. NEWCOMER JR.
FRANK WHEELER
BY
John P. Chandler
THEIR ATTORNEY.

Jan. 31, 1961     J. R. NEWCOMER, JR., ET AL     2,969,667
LATCH FASTENER
Filed May 14, 1956                        3 Sheets-Sheet 2
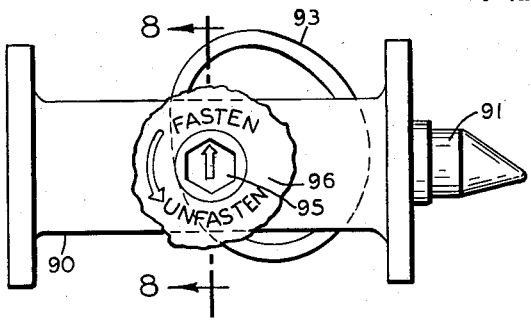
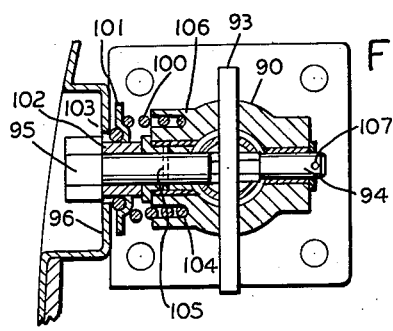
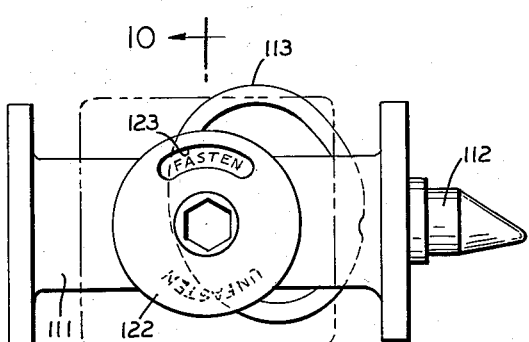
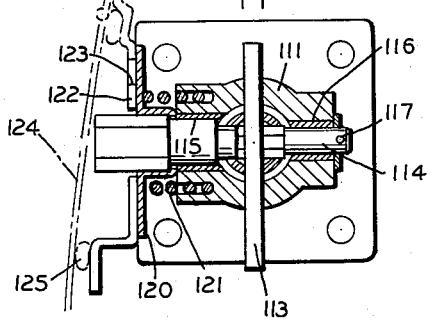
INVENTORS.
JACOB R. NEWCOMER JR.
FRANK WHEELER
BY
THEIR ATTORNEY.

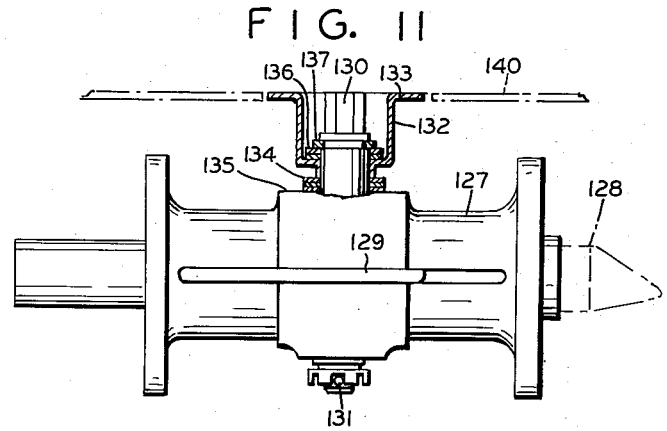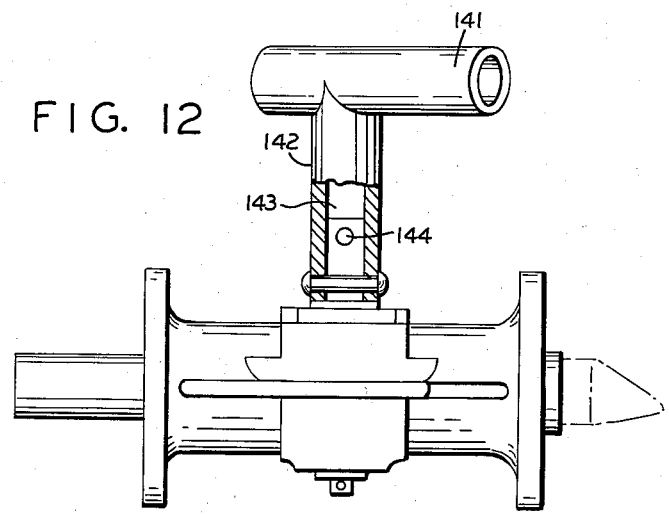
INVENTORS.
JACOB R. NEWCOMER JR.
FRANK WHEELER 2,969,667
Patented Jan. 31, 1961

United States Patent Office

2,969,667
LATCH FASTENER

Jacob R. Newcomer, Jr., Westwood, and Frank Wheeler, Little Falls, N.J., assignors to Camloc Fastener Corporation, Paramus, N.J., a corporation of New York Filed May 14, 1956, Ser. No. 584,600

4 Claims. (Cl. 70—134)

This invention relates to latch fasteners with slidable bolts which are manually moved to fastened and unfastened position and relates more particularly to a novel sliding latch bolt having a high strength and low weight ratio and which is provided with novel means for indicating the fastened and unfastened positions.

An important object of the invention is to provide a slidable bolt latch fastener with novel cam means for positively actuating the bolt in both directions, the cam being of generally elliptical shape and which is rotatable with a manipulating shaft, the bolt having a novel spring loaded cam follower for engaging the outer periphery of the cam.

A further object of the invention is to provide a fastener which is sealed from the elements and wherein the manipulating means is automatically adjustable to the plane of the outer skin of the structure employing the fastener. For instance, in a structural door, hinged or otherwise, of an aircraft the skin line is allowed to vary relative to more important structural elements and it is desirable to have the outer components of the fastener flush with this skin line.

Thus, in one form of the invention the fastener has this unique facility for self-adjusting to contour tolerance, by seeking its own bearing level and in another form the fastener is manually adjustable to bring about this flush relation with the skin line. In yet a further form the manipulating end of the cam shaft which moves the latch bolt in and out of the housing or frame is buried completely within the structure and, if desired, a hinged access door may be employed to close the recess.

A further object of the invention is to provide a fastener with a slidable bolt having an eccentrically disposed tapered nose which will correct misalignment of the parts, which is a frequent occurrence.

In the drawings:

Fig. 7 is a front elevation of a modified form of the invention.

Fig. 8 is a section taken on line 8—8 of Fig. 7.

Fig. 9 is a front elevation showing a second modified form of the invention.

Fig. 10 is a section taken on line 10—10 of Fig. 9.

Fig. 11 is a longitudinal section taken through a third modified form of the invention.

Fig. 12 is a side elevation showing a different type of handle for turning the shaft.

Figure 1:
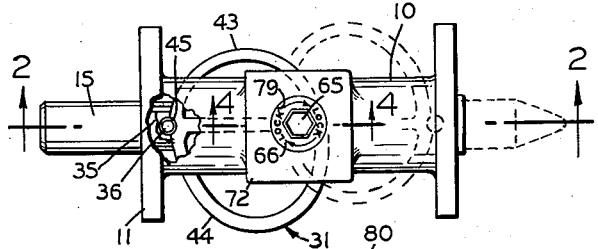
Fig. 1 is a front elevation of a latch fastener embodying the present invention.

The fastener of the present invention includes an elongated tubular housing or barrel 10 formed with end walls 11 having holes (not shown) to permit rigid installation of the fastener within the door or other structure by which it is carried. The housing is provided with a throughbore 12 and which is formed at each end thereof with counterbored sections 13 which receive bearing bushings 14 within which a latch bolt 15 arranged to take loads is mounted for sliding movement. The bearing bushings have slots 16 to provide clearance for rotation of an elliptically shaped cam.

The latch bolt is tapered at its forward end and comes to a point 20 to enable the latch bolt to enter an opening in the other structure in case the two structures are somewhat misaligned.

Figure 2:
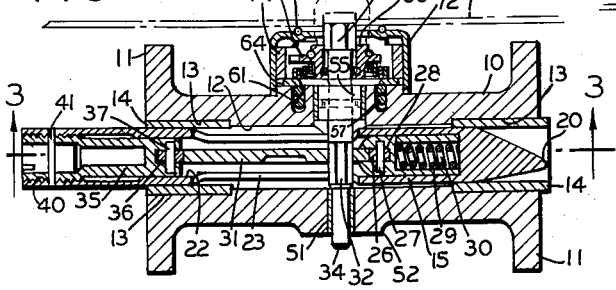
Fig. 2 is an enlarged central longitudinal section taken on line 2—2 of Fig. 1.
Figure 3:
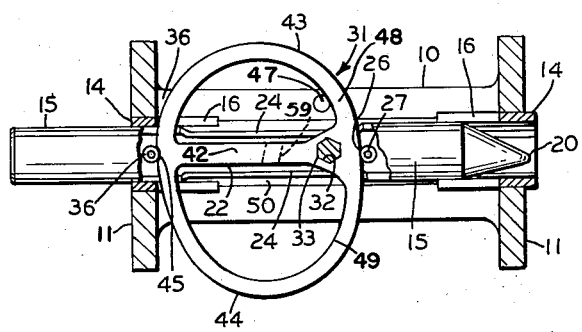
Fig. 3 is a central longitudinal section taken on line 3—3 of Fig. 2.

In Figs. 2 and 3 this point is shown as being eccentric to the central axial line of the latch bolt and is located at a point removed from the outside skin shown at 21. Depending upon the particular installation this point may be variously located in other latch bolts which may be supplied with the fastener.

The latch bolt has a bore 22 extending from its inner terminal and it also has opposed elongated slots 23 in its inner and outer side walls when viewed as in Fig. 2, and similar opposed slots 24 in its upper and lower walls as shown in Fig. 3. A forward cam follower has a cam-engaging roller 26 mounted on a pin 27 in a slot 28 at its rear end and a longitudinal bore 29 at its forward end which receives a compression spring 30 which, when not under compression, extends forwardly of the forward end of the end of the bore so the follower is spring loaded at all times.

A cam 31 of elliptical contour is provided with an eccentrically disposed, non-circular opening 32 which receives a non-circular portion 33 of a cam shaft 34, said portion having in this first embodiment a sliding engagement relative to the opening in the cam. A rear cam follower 35 has a cam-engaging roller 36 mounted on a pin 37 located in a slot 38 at its forward end. This follower is adjustable longitudinally of the latch bolt. To effect this adjustment the cam follower is externally threaded and is received in an internally threaded section 40 of bore 22. A pin 41 secures the follower in an adjusted fixed position longitudinally of the bore.

Figure 4:
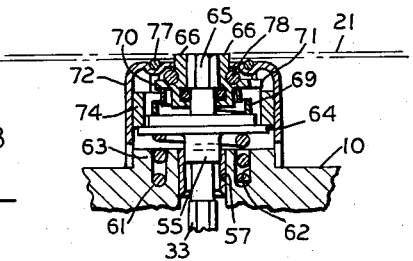
Fig. 4 is a broken section taken on line 4—4 of Fig. 1 and showing the position of the parts when the latch is fastened.
Figure 5:
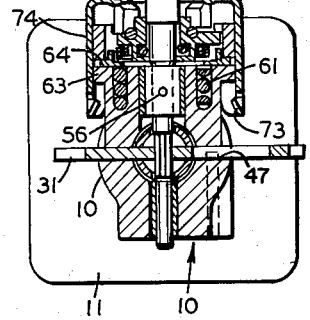
Fig. 5 is a transverse section taken through the fastener.

The cam has a central reinforcing strut 42, a driving surface 43 for effecting forward movement of the latch bolt and a driving surface 44 for rearward movement thereof and the two surfaces are defined at a point remote from the cam axis by a detent 45 which is the high point of the cam. By virtue of the spring loading of the forward cam follower and the adjustability feature of the rear cam follower the cam engaging rollers carried by the followers are in contact with the cam at all times. It is preferred to provide suitable stop means for limiting rotation of the shaft 34 and cam 31 keyed thereto and this can be accomplished by a fixed stop which is engaged by a member which rotates with the shaft such as a pin 47 (Figs. 3 and 4) which is engaged by the upper cam section 48 when the latch bolt has been moved to the unlocked position of Fig. 3 or by the lower portion 49 when the bolt has reached its maximum outer position. With this arrangement the under face of strut 42 has a shallow recess 59 to permit the strut to pass the fixed pin which, as shown in Fig. 5, extends upwardly only about one-half the thickness of the cam.

The housing is provided with opposed longitudinal slots 50 (Fig. 3) aligned with slots 16 in the bearing bushings and slots 24 in the latch pin to permit rotation of the cam therein. The other slots 23 in the latch bolt provide clearance for the cam shaft during forward and rearward travel of the latch bolt. The cam shaft has an inner end portion of reduced diameter and which is received in bearing 51 positioned in an inner boss or bearing trunnion 52 (Fig. 2). On the opposite end the cam shaft carries a sleeve 55 which is secured thereto by a pin 56, the sleeve being mounted for rotation and for sliding movement in a bearing bushing 57 in a second boss or trunnion 58 opposite to and aligned with boss 52.

Figure 6:
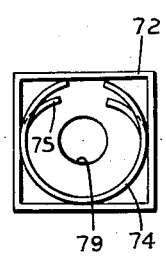
Fig. 6 is a bottom plan view of the cup.

The cam shaft is urged outwardly by means of a compression spring 61 mounted in an annular recess 62 in a square boss 63, said spring urging against a flange 64 preferably formed integrally with sleeve 55. The upper end of the shaft has a non-circular wrench receiving portion 65 and a button 66 has a bore of the same shape which receives portion 65 in sliding relation. The button is urged outwardly by a compression spring 69 seated at its lower end on flange 64 and engages a flange 70 on the button, which flange has a peripheral projection 71. A square inverted cup 72 is mounted for vertical sliding movement on square boss 63 and its upward movement is limited by inwardly turned ears 73 (Fig. 5). This square cup has an internal retainer ring 74 (Fig. 6) and formed with two punched out fingers 75 which are inwardly bent and when the latch is in its unfastened position the button is down in the position of Fig. 2 and is held there by projection 71 underlying fingers 75. Flange 64 also underlies retainer ring 74 at all times and urges cup 72 upwardly into engagement with the lower face of the outer skin 21 of the structure such as an aircraft. As was earlier pointed out the location of this skin with reference to the fastener may vary and with the arrangement shown the cup is always firmly engaging the skin. A resilient gasket 77 located in an annular recess in the top wall of the cup forms a weather seal.

The cup 72 thus limits upward movement of the shaft since flange 64 carried by the latter engages the retainer ring in the cup and pushes it as far as ears 73 permit. The flange 70 on the button carries a resilient sealing ring 78. The cup has a circular opening 79 for the button and upward travel of the button is limited when sealing ring 78 engages the cup. Thus when the parts are in the fastened position of Fig. 4 the upper faces of the shaft and the button are on the same plane as the skin 21. When it is desired to unfasten the latch a tool 80 is placed over the shaft and the button depressed and the tool rotated about one-half turn. The parts are moved from the dotted line position to the full line position of Fig. 1, and when the tool is removed the button stays in its recessed position due to projection 71 underlying fingers 75. This indicates the unfastened position. A third sealing ring 80' is positioned in an internal groove in the non-circular bore in the button.

The same basic structure, including the barrel, the latch bolt, the cam and the cam shaft, are employed in the modified forms of the invention and the differences lie principally in the manipulating means and in the mounting of the fastener within the structure.

Thus in Figs. 7 and 8 the barrel 90, the latch bolt 91 and the cam 93 are the same as in Fig. 1. The shaft 94, however, has a hexagon head 95 which is recessed within a pocket 96 in the structure. A spring 100 in an annular slot in the barrel urges against a washer 101 carried on a bushing 102 on the shaft. A resilient sealing ring 103 closes the area between the shaft and the pocket. The shaft carries a sleeve 104 secured thereto by a pin 105. This sleeve is rotatably mounted in a bearing sleeve 106 in a transverse bore in the barrel. It will be noted that a pin 107 limits outward travel of the shaft.

In the structure shown in Figs. 9 and 10 the barrel 111, latch bolt 112, cam 113 are the same as in the first embodiment. The shaft 114 is journalled in bearing bushings 115 and 116 and a pin 117 limits outward travel of the shaft. A non-circular head at the other end of the shaft receives a wrench.

A plate 120 having a sleeve 121 is keyed to the shaft and this plate has the notations "Fastened" and "Unfastened" printed thereon. The structure in this instance includes a recessed pocket 122 having a sight opening 123 through which the notations can be read. The pocket is adapted to be closed by a hinged closure door 124 having a resilient ring 125 forming a weather seal.

The latch fastener of Fig. 11 has the same barrel 127, latch bolt 128, cam 129 and a shaft 130 having a pin 131 limiting outward travel.

In this instance a cup 132, which rotates with the shaft, has an outer flange 133 and its base has a central opening to receive the shaft. The position of the cup is adjustable longitudinally of the shaft by means of washers 134 between the base of the cup and boss 135 of the barrel. Other similar washers 136 are carried between the cup base and a snap ring 137 carried in an annular recess in the shaft. The outer flange 133 should preferably be on the plane of the skin 140 which has an opening for the cup.

In Fig. 12 a handle 141 having a sleeve 142 is secured to the shaft by pins 144.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What we claim is:

1. A latch fastener comprising an elongated housing having a through longitudinal bore and provided with means for attachment to a structure provided with an outer skin having an opening therein, a pair of bosses on the housing forming bearing trunnions disposed transversely of the bore on opposite sides thereof and bearings in said trunnions, a shaft provided with tool receiving means at its outer end and journalled in said bearings for rotative and slidable movement, the housing having a through longitudinal slot at right angles to the shaft, a generally elliptical cam in the slot and having an opening adjacent one of its edges to slidably receive the shaft which is keyed thereto for conjoint rotation therewith, a latch bolt tapered at its forward end slidable in the housing bore and having a pair of through longitudinal slots at right angles to each other, one to receive the cam and one to receive the shaft to permit travel of the latch bolt, spaced followers carried by the latch bolt engaging opposite sides of the cam whereby the latch bolt can be moved to fastening and unfastening position on rotation of the shaft, a cup mounted on one of the bosses and slidable toward and away from the housing, spring means urging the cup and the shaft towards the skin and means limiting outward travel of the shaft towards the skin opening.

2. The latch fastener defined in claim 1 wherein the cam is provided with a detent on the side opposite the shaft opening to receive one of the cam followers when the bolt has been moved outwardly to fastening position and wherein at least one of the followers is spring urged against the cam.

3. A latch fastener comprising an elongated housing having a through longitudinal bore and provided with means for attachment to a structure provided with an outer skin having an opening therein, a pair of bosses on the housing forming bearing trunnions disposed transversely of the bore on opposite sides thereof and bearings in said trunnions, a shaft having tool engaging means at its outer end journalled in said bearings for rotative and slidable movement, the housing having a through longitudinal slot at right angles to the shaft, a generally elliptical cam in the slot and having an opening adjacent one of its edges to slidably receive the shaft which is keyed thereto for a conjoint rotation therewith, a latch bolt tapered at its forward end slidable in the housing bore and having a pair of through longitudinal slots at right angles to each other, one to receive the cam and one to receive the shaft to permit travel of the latch bolt, spaced followers carried by the latch bolt engaging opposite sides of the cam whereby the latch bolt can be moved to fastening and unfastening position on rotation of the shaft, a flange keyed to the shaft adjacent the tool engaging means, a spring urging the flange outwardly, a depressible button carried on and normally enclosing the outer end of the shaft, a spring carried by the flange urging the button outwardly, a cup slidably mounted on the housing, the button urging the cup into engagment with the skin, and resilient, sealing means between the skin, the cup and the button.

4. A latch fastener comprising an elongated housing having a through longitudinal bore and provided with means for attachment to a structure provided with an outer skin having an opening therein, a pair of bosses on the housing forming bearing trunnions disposed transversely of the bore on opposite sides thereof and bearings in said trunnions, a shaft journalled in said bearings for rotative and slidable movement, the housing having a through longitudinal slot at right angles to the shaft, a generally circular cam in the slot and having an opening adjacent one of its edges to slidably receive the shaft which is keyed thereto for a conjoint rotation therewith, a latch bolt tapered at its forward end slidable in the housing bore and having a pair of through longitudinal slots at right angles to each other, one to receive the cam and one to receive the shaft to permit travel of the latch bolt, spaced followers carried by the latch bolt engaging opposite sides of the cam whereby the latch bolt can be moved to fastening and unfastening position on rotation of the shaft, a spring urging the shaft in the direction of the skin opening and means limiting such travel of the shaft.

References Cited in the file of this patent

UNITED STATES PATENTS

| | | |
|---|---|---|
| 491,779 | Leitch | Feb. 14, 1893 |
| 928,905 | Cottrell | July 20, 1909 |
| 1,020,454 | Seidenbecker | Mar. 19, 1912 |
| 1,674,906 | Lamb | June 26, 1928 |
| 1,979,805 | Main | Nov. 6, 1934 |
| 2,721,750 | Rudis et al. | Oct. 25, 1955 |

FOREIGN PATENTS

| | | |
|---|---|---|
| 14,480 | Great Britain | June 19, 1911 |
| 517,056 | Great Britain | Jan. 18, 1940 |